April 17, 1962 M. M. LANDE 3,029,613
ICE CREAM FREEZING APPARATUS
Filed Aug. 18, 1960 2 Sheets-Sheet 1
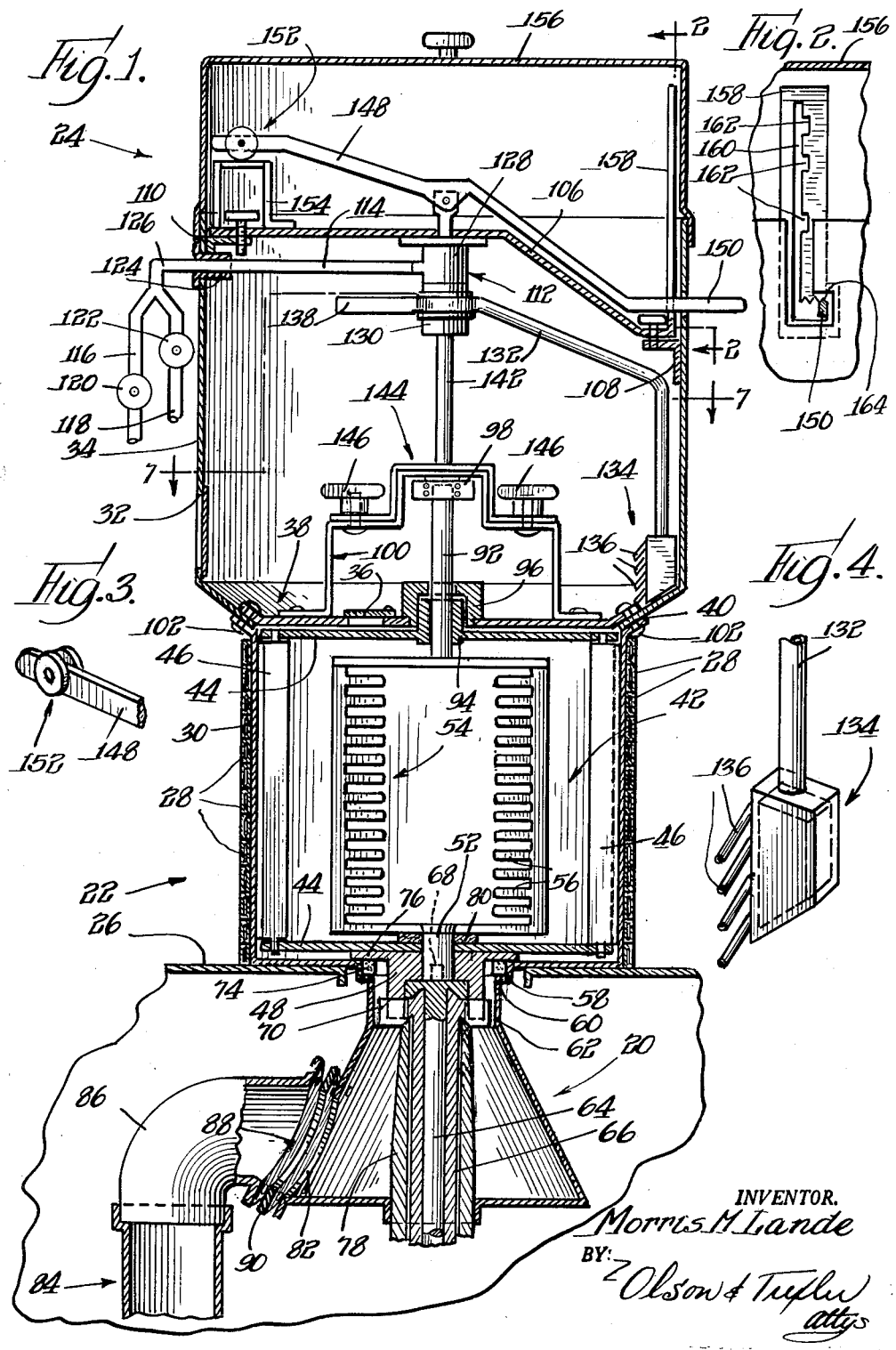

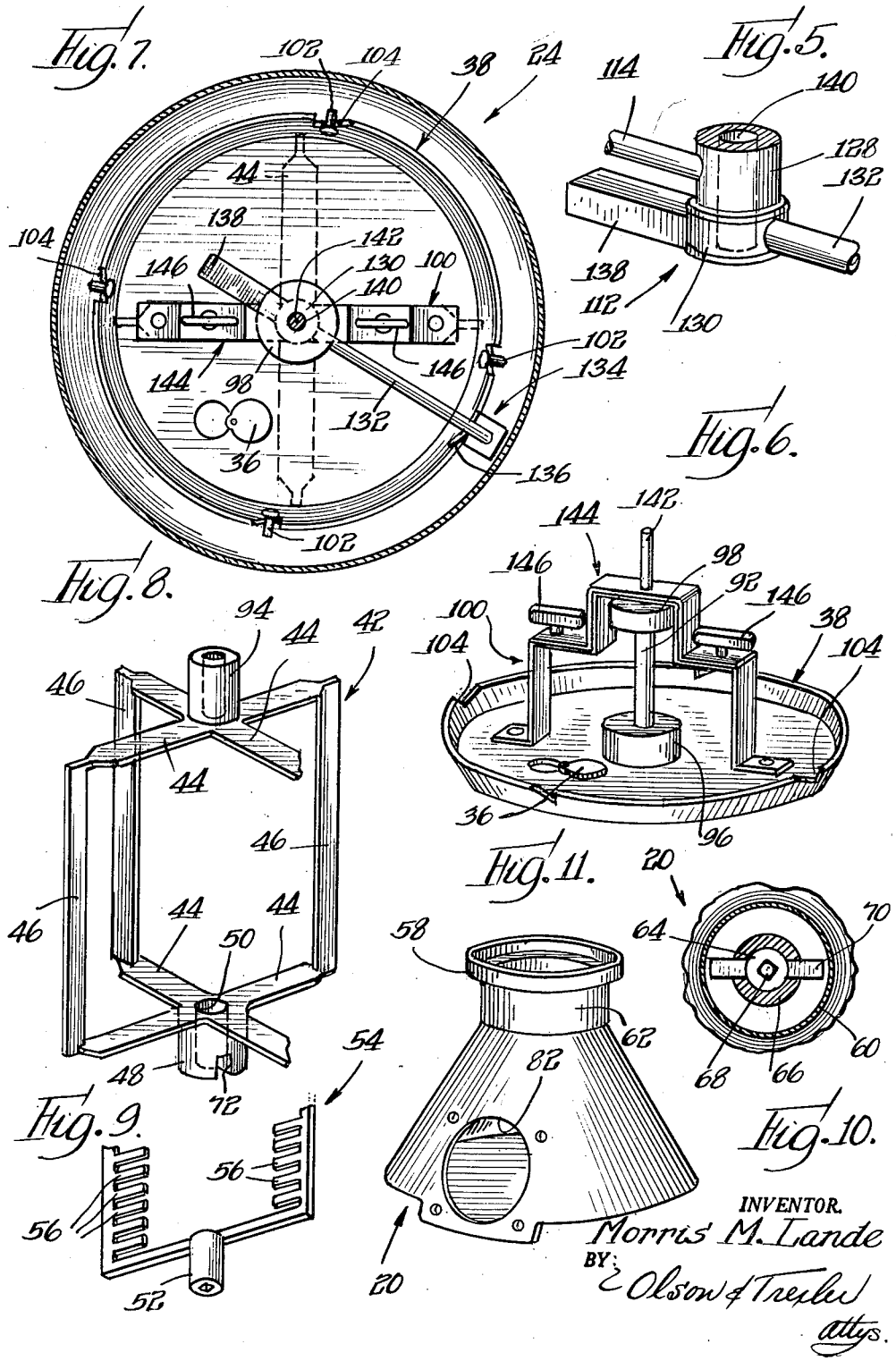

United States Patent Office 3,029,613
Patented Apr. 17, 1962

3,029,613
ICE CREAM FREEZING APPARATUS
Morris M. Lande, 601 W. 110th St., New York, N.Y.
Filed Aug. 18, 1960, Ser. No. 50,522
6 Claims. (Cl. 62—303)

This invention relates generally to ice cream making apparatus and especially to ice cream freezing apparatus adapted for batch operation.

A common inconvenience encountered in making ice cream in a batch operation is the cleaning and sanitation required after the completion of each cycle. Apparatus which has heretofore been available for making ice cream in a batch operation has not been particularly well adapted to cleaning and sanitizing; and accordingly, a substantial proportion of the total time and labor needed to complete a batch of ice cream is consumed in the cleaning and sanitation steps. Ordinarily, the apparatus must be almost completely disassembled and much manual cleaning is involved. Because of these difficulties, inadequate cleaning and sanitizing procedures are sometimes resorted to, particularly between different batches of the ice cream. Inadequate water rinses are frequently made to suffice in such instances.

Therefore, an important object of the present invention is to provide ice cream freezing apparatus which is easily, quickly and thoroughly cleaned.

A more general object of the invention is to provide a new and improved ice cream freezing apparatus.

Another object is to provide ice cream freezing apparatus which is arranged to reduce the need for substantial disassembly of the apparatus for cleaning.

Yet another object of the invention is to provide ice cream freezing apparatus which is substantially leak-proof at the rotating shaft.

Additional objects and features of the invention pertain to the particular structure, materials and arrangements whereby the above objects are attained.

A structure in accord with the invention includes a first chamber adapted for processing batches of ice cream composition, refrigerant flow channels encircling the chamber, blade means rotatably mounted in the first chamber including a plurality of scraper blades and a plurality of mixer blades, the mixer blades being counterrotatably mounted with respect to the scraper blades, drive means selectively coupleable to the blade means, a second chamber superposed on the first chamber to communicate selectively therewith, the second chamber being adapted to have the blade means at least partially retracted therein for cleaning and sanitizing the first chamber and the blade means, and selectively operable means in the second chamber for directing a flow of cleaning and sanitizing materials over the blade means and over the interior of the first chamber.

The invention, both to its structure and mode of operation, will be better understood by reference to the following disclosure and drawings forming a part thereof, wherein:

FIG. 1 is a side-elevational view in cross-section of ice cream freezing apparatus constructed in accordance with the invention;

FIG. 2 is a view taken through the section 2—2 of FIG. 1;

FIG. 3 is an enlarged perspective view of the pivot means associated with the flow control lever;

FIG. 4 is an enlarged, perspective view of the flow nozzle assembly;

FIG. 5 is an enlarged, perspective view of the washer hub assembly;

FIG. 6 is an enlarged, perspective view of the ice cream freezing chamber closure and associated elements;

FIG. 7 is a view taken through the section 7—7 of FIG. 1;

FIG. 8 is an enlarged, perspective view of the blade means showing the scraper blades and showing the mixer blades removed;

FIG. 9 is a fragmentary, perspective view of the mixer blade unit which is assembled to the blade means of FIG. 8 in use;

FIG. 10 is a top plan view of the drain chamber showing the coupling and drive means; and FIG. 11 is a perspective view of the drain chamber.

Referring now in detail to the drawings, specifically to FIG. 1, an ice cream freezing apparatus will be seen to include a drain chamber 20, an ice cream processing chamber 22 and a cleaning equipment chamber 24 superposed over one another in that order. The processing chamber 22 is arranged to be situated upstanding from a cabinet 26, the cabinet 26 enclosing the drain chamber 20 as well as the refrigeration unit, the drive motor and other components customarily associated with an ice cream making apparatus.

Refrigerant flow channels 28 encircle the walls 30 of processing chamber 22 in order to provide means for withdrawing heat from the ice cream composition being processed within the chamber, the ice cream composition being introducible into chamber 22 through a suitably closured opening 32 in the sidewalls 34 of equipment chamber 24 and through a closured opening 36 formed in a cover assembly 38 which closes an aperture 40 communicating chamber 24 with chamber 22. When the processing of a batch of ice cream composition has been completed, the soft-finished ice cream is run out of the chamber 22 through a spout, not shown, in compliance with customary procedures.

In order to insure proper agitation of and good heat transfer from the ice cream composition, a blade assembly 42 is rotatably mounted within the processing chamber 22. Assembly 42 includes both scraper blades and mixer blades or paddles; and turning for the moment to FIGS. 8 and 9, the blade assembly 42 will be seen to include two sets of laterally extending arms 44 which are vertically spaced-apart to have vertically extending scraper blades 46 mounted between their respective ends. The blade assembly 42 also includes a coupling hub 48 which depends from the lower arms 44 in order to be united to drive means as will be described more fully hereinafter. The hub 48 defines a central bore 50 which slidably and rotatably receives the stem 52 of a mixer blade unit 54 shown in FIG. 9. The mixer unit 54 includes a number of mixer blades 56 which are arranged to be counterrotatable with respect to the scraper blades 46 as will also be described more fully hereinafter.

Returning to FIG. 1, the processing chamber 22 will be seen to terminate in a drain throat 58 which is adapted to receive the flanged end 60 of a collar portion 62 of drain chamber 20. Extending upwardly into the collar portion 62 is a pair of concentric, counterrotatably driven shafts, shafts 64 and 66. The inner shaft 64 terminates in a square stub 68 which is adapted to enter a cooperatively shaped bore in stem 52 of the mixer blade unit 54. The outer shaft 66, on the other hand, terminates in a cross-arm member 70 which is adapted to enter slots 72 in the hub 48. A seal is advantageously effectuated between the processing chamber 22 and the drain chamber 20 by means of a gasket 74 which is seated between the flanged end 60 of collar portion 62 and a radially outwardly extending flange portion 76 of the hub 48. Furthermore, a sleeve bearing 78 surrounds shaft 66 in order to shield and separate the rotating shafts 64 and 66 from the drain chamber 20. In addition, a washer 80 is desirably situated between the lower arms 44 of blade assembly 42 and the corresponding arms of mixer unit 54.

Continuing with reference to FIG. 1 and with secondary reference to FIG. 11, the drain chamber 20 will be seen provided with an opening 82 which is adapted to exhaust chamber 20 through a conduit indicated generally by the numeral 84. Conduit 84 is coupled to the opening 82 by means of an elbow unit 86 which is arranged to present a flanged opening 88 to the opening 82. The elbow unit 86 is held against drain unit 20 by means of thumb screw fasteners or other suitable means with the flanged opening 88 communicating with the opening 82. Advantageously, a sealing gasket 90 is interposed between the flanged opening 88 and the peripheral walls of opening 82. Opening 82 is desirably arranged to be larger than throat 58 to prevent flooding of chamber 20.

As will be seen in FIG. 1, the mixer unit 54 is provided with a lift rod 92 upstanding from its top end. Rod 92 passes slidably and rotatably through a bushing 94 upstanding from the upper arms 44 of blade assembly 42 and through a hollowed bushing 96 affixed atop cover 38. Rod 92 has a cap 98 rotatably mounted at its otherwise free end employing ball bearings, cap 98 being adapted to contact portions of a bracket 100 without interfering with the rotation of shaft 92. The bracket 100 is secured to cover 38 by rivets or other suitable means and is adapted for use in raising the cover 38 when pins 102 have been disengaged from notches 104 formed in the upwardly and outwardly flaring edges of the cover releasing the cover for retraction from aperture 40.

In compliance with an important feature of the invention, means are provided in chamber 24 for selectively directing a flow of cleaning and sanitizing materials over the blade assembly 42 and over the interior of chamber 22 when cover 38 is raised to unblock the aperture 40. These means include a support member 106 which is detachably mounted on spaced-apart channel brackets 108 and 110 as by means of thumbscrews or other suitable fasteners. A hub unit 112 is secured to the underside of support member 106, hub unit 112 receiving a flow of water and other sanitizing materials, such as chlorine solution, through a conduit 114 which is connected to inlet lines 116 and 118 through valves 120 and 122 respectively. Advantageously, a detachable coupling 124 is provided for connecting and disconnecting conduit 114 with a common line 126 emanating from the inlet lines 116 and 118.

The hub unit 112 comprises a fixed element 128 and a rotatable element 130, there being a flow directing means in the hub unit 112 communicating the conduit 114 with an outlet tube 132 which is affixed to the rotatable element 130. A spray unit 134 is secured to the outlet end of conduit 132, and spray unit 132 includes a number of nozzles 136 which are downwardly angulated to direct flow in the general direction of the interior of chamber 22. The nozzles 136 are also desirably angulated laterally in order to rotate unit 134 by the jet action of the flowing materials. Advantageously, a counterweight 138 is affixed to element 130 for balancing unit 130 against the weight of nozzle unit 134.

As is well shown in FIGS. 5 and 7, the hub unit 112 is provided with an elongated central bore 140 which extends through both of the elements 128 and 130. A shaft 142 passes slidably and rotatably through bore 140 to have a bracket 144 affixed to its lower end, as shown in FIG. 1, bracket 144 being securable to bracket 100 by means of the fasteners 146. A lever arm 148 is pivotally mounted to the upper end of rod 142. Lever 148 terminates in a handle 150 at one end and in a roller unit 152 at its other end. Roller unit 152 is adapted to cooperate with a bracket 154 mounted atop support member 106 in affording a fulcrum for lever 148.

Chamber 24 is provided with a liftable cover 156, friction fit over chamber 24; and when cover 156 is raised, handle 150 may be operated to lift rod 142 and the elements secured thereto. The handle 150 is positionable in a number of locations, and this positioning of the handle 150 is achieved by means of a vertically upstanding arm portion 158 of the support member 106. As is shown in FIG. 2, this upstanding arm portion 158 defines a vertical slot 160 having a number of lateral recesses 162 adapted to receive handle 150. Slot 160 is also provided with a laterally elongated recess 164 which affords an opportunity for a slight rotation of handle 150 whereby to control the positioning of the pins 102 in the notches 104 of cover 38 thereby tightening the cover.

Having thus described one construction of the invention, it is important now to state how the illustrated embodiment operates. With the elements assembled as illustrated in FIG. 1, the cover 38 may be secured over the aperture 40 by turning handle 150 into the lateral recess 164 whereby cooperation between the pins 102 and the notches 104 leads the cover 38 into sealing engagement with the sides of aperture 40. Ice cream composition will then be poured through the closured apertures 32 and 36 into the processing chamber 22. Thereupon, refrigerant will be caused to flow through the channels 28 and motive force will be applied to the shafts 64 and 66 to drive the blade assembly 42.

After the ice cream composition has been processed, the flow of refrigerant through channels 28 will be terminated and transmission of motive force to the shafts 64 and 66 will be caused to cease. The ice cream is run out of chamber 22, and the apparatus is now ready for cleaning. Pursuant to this objective, the cover 156 will be removed from chamber 24. Thereafter, handle 150 will be laterally rotated through a small arc out of recess 164 and into slot 160 thereby turning the notches 104 in cover 38 out of engagement with the pins 102. With these elements so arranged, lifting of the handle 150 will raise rod 142 through the bore 140 in hub 112. This raising of the rod 142 will be accompanied by a raising of bracket 144, bracket 100 and cover 38; and the several members may be variously positioned according to which of the lateral recesses 162 the handle 150 is reposited in. As will be recognized, if cover 38 is raised sufficiently for bushing 96 to encounter the cap 98, continued raising of cover 38, as incurred by raising rod 142, will first lift the mixer unit 54 of blade assembly 42 so as to expose stem 52 for cleaning. Thereafter, continued raising of cover 38 will lift the entire assembly 42 and disengage the coupling of stem 52 and hub 48 from the shaft 64 and the shaft 66 respectively. Moreover, this raising of the blade assembly 42 will dislocate flange 76 from gasket 74 thereby opening the processing chamber 22 to the drain chamber 20.

When the cover 38 is raised in its position out of obstruction with the aperture 40, the valves 120 and 122 may be opened causing cleaning and sanitizing materials to flow through the nozzles 136 and, therefore, over the blade assembly 42 and the interior of chamber 22. As will become apparent, the apparatus of the invention is arranged for spray washing of flooding and soaking, as is desired, and also for draining, according to the degree of raising or lowering of cover 38 and rod 92, as well as for various stages of lifting of the blade assembly 42 whereby to expose different portions of the assembly to the flow of materials emanating from the nozzles 136.

With the cover 156 removed, the several units positioned within chambers 22 and 24 become readily accessible for disassembly and removal whenever this is desired. Such removal is made possible by loosening the fasteners 146 and the fasteners associated with member 106. Thereupon, the member 106 and its associated parts can be lifted out; and subsequently, the cover 38 and its associated parts, including blade assembly 42, can be removed.

After the several parts have been thoroughly cleaned and sanitized, the valves 120 and 122 are shutoff and the parts allowed to drain before being lowered into position for freezing another batch of the ice cream composition.

The specific embodiment herein shown and described is intended to be illustrative only. Various changes in structure will, no doubt, occur to those skilled in the art; and these changes are to be understood as forming a part of this invention insofar as they fall within the spirit and scope of the appended claims.

The invention is claimed as follows:

1. In ice cream freezing apparatus, the combination comprising: a first chamber adapted for processing batches of ice cream composition; refrigerant flow channels encircling the walls of said first chamber; blade means rotatably mounted in said first chamber; drive means coupleable to said blade means; a second chamber superposed on said first chamber and defining an aperture communicating said chambers, said blade means being at least partially retractable through said aperture into said second chamber for cleaning and sanitizing said first chamber and said blade means; selectively operable closure means for said aperture; and rotatable nozzles in said second chamber for directing a flow of cleaning and sanitizing materials over said blade means and over the interior of said first chamber when said closure means is operated to open said aperture.

2. In ice cream freezing apparatus, the combination comprising: a first chamber adapted for processing batches of ice cream composition; refrigerant flow channels encircling the walls of said first chamber; blade means rotatably mounted in said first chamber including a plurality of scraper blades arranged to pass closely adjacent the walls of said first chamber and further including a plurality of mixer blades counterrotatably mounted with respect to said scraper blades; drive means coupleable to said blade means; a second chamber superposed on said first chamber and defining an aperture communicating said chambers, said blade means being at least partially retractable through said aperture into said chamber for cleaning and sanitizing said first chamber and said blade means; selectively operable closure means for said apertures; and rotatable nozzles in said second chamber for directing an angulated flow of cleaning and sanitizing materials over said blade means and over the interior of said first chamber when said closure means is operated to open said aperture.

3. Apparatus according to claim 1 further comprising means for operating said closure means and independently retracting said blade means.

4. Apparatus according to claim 1 further comprising means coupling said drive means to said blade means including a hub and wherein said first chamber defines a drain for said materials, said drain being closeable by said hub.

5. In ice cream freezing apparatus, the combination comprising: a first chamber adapted for processing batches of ice cream composition; refrigerant flow channels encircling the walls of said first chamber; blade means rotatably mounted in said first chamber; drive means coupleable to said blade means; a second chamber dependingly arranged with said first chamber to pass said drive means and to communicate said first chamber with flow exit means; a third chamber superposed on said first chamber and defining an aperture communicating said first and third chambers, said blade means being at least partially retractable through said aperture into said third chamber for cleaning and sanitizing said first chamber and said blade means; selectively operable closure means for said apertures; and rotatable nozzles in said third chamber for directing a flow of cleaning and sanitizing materials over said blade means and over the interior of said first chamber when said closure means is operated to open said aperture.

6. In ice cream freezing apparatus, the combination comprising: a first chamber adapted for processing batches of ice cream composition, said first chamber defining a drain for cleaning and sanitizing materials; refrigerant flow channels encircling the walls of said first chamber; blade means rotatably mounted in said first chamber including a plurality of scraper blades arranged to pass closely adjacent the walls of said first chamber and further including a plurality of mixer blades counterrotatably mounted with respect to said scraper blades, said blade means being at least partially retractable from said first chamber; drive means; means coupling said drive means to said blade means including a flanged bushing adapted to close said drain; a second chamber superposed on said first chamber to communicate selectively therewith through an aperture, said second chamber being adapted to have said blade means at least partially retracted therein for cleaning and sanitizing said first chamber and said blade means; closure means for said aperture disposed in said second chamber; means for operating said closure means and independently retracting said blade means; and selectively operable means in said second chamber for directing a flow of cleaning and sanitizing materials, said selectively operable means including rotatable nozzles directing an angulated flow of said materials over said blade means and over the interior of said first chamber when said closure means is operated to open said aperture.

References Cited in the file of this patent

UNITED STATES PATENTS

| | | |
|---|---|---|
| 1,628,141 | Gray | May 10, 1927 |
| 2,013,501 | Parker | Sept. 3, 1935 |
| 2,245,575 | Court | June 17, 1941 |
| 2,306,926 | Allen | Dec. 29, 1942 |
| 2,849,868 | Andersson | Sept. 2, 1958 |
| 2,933,093 | Handyside | Apr. 19, 1960 |

UNITED STATES PATENT OFFICE
CERTIFICATE OF CORRECTION

Patent No. 3,029,613            April 17, 1962

Morris M. Lande

It is hereby certified that error appears in the above numbered patent requiring correction and that the said Letters Patent should read as corrected below.

Column 4, line 55, for "of" read -- or --; column 5, line 35, before "chamber" insert -- second --.

Signed and sealed this 21st day of August 1962.

(SEAL)
Attest:

ESTON G. JOHNSON
Attesting Officer

DAVID L. LADD
Commissioner of Patents